Boynton & McGaw.
Removing Burrs &c. from Wool.
Nº 72966      Patented Jan. 7, 1868.
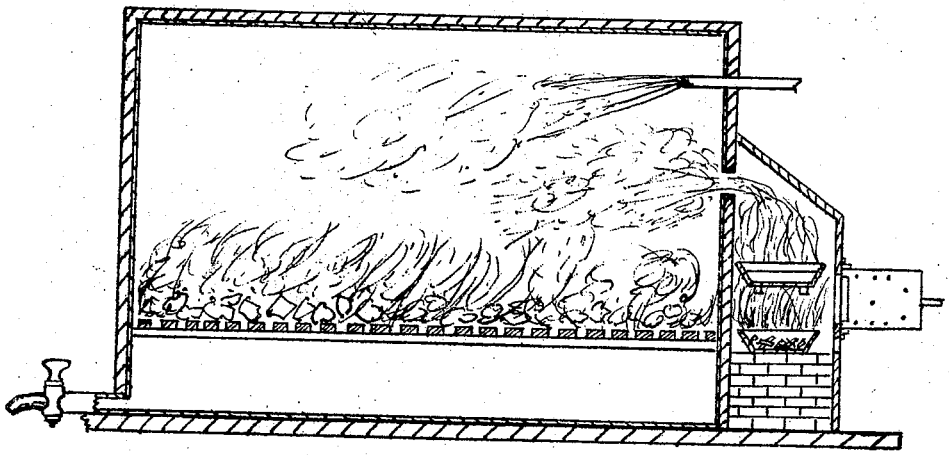
Witnesses.
Inventors.

United States Patent Office.

JOHN W. BOYNTON, OF EAST HARTFORD, CONNECTICUT, AND JOHN A. McGAW, OF NEWARK, NEW JERSEY.

*Letters Patent No. 72,966, dated January 7, 1868.*

IMPROVED MODE OF REMOVING BURRS AND OTHER VEGETABLE MATTERS FROM WOOL.

*The Schedule referred to in these Letters Patent and making part of the same.*

TO ALL WHOM IT MAY CONCERN:

Be it known that we, JOHN W. BOYNTON, of East Hartford, county of Hartford, and State of Connecticut, and JOHN A. McGAW, of Newark, county of Essex, and State of New Jersey, have invented certain new and useful Improvements in the Mode or Process for Destroying Burrs or other Vegetable Substances from Wool; and to enable others skilled in the art to make, use, or practise the same, we will proceed to describe.

The nature of this invention consists in the employment of chemical preparations diffused among the mass or fibres of the wool in such a manner as to completely destroy burrs or other vegetable substances therefrom, without destroying or injuring the wool itself. It further consists in the use or employment of steam, with proper chemical preparations for the purpose of diffusing and producing heat and moisture through wool, to destroy burrs and other vegetable substances therefrom.

The destruction and removal of burrs and other vegetable substances from wool, in preparing it for manufacturing purposes, has become a great desideratum. Efforts have been made to accomplish the object of removing burrs and other vegetable substances in wool, to prepare it for carding, without destroying or injuring the staple of the wool, which heretofore have been attended with little or but partial success. There are, no doubt, several preparations which may partially or quite effect the object stated above. Among them, we believe the following to be well adapted to secure the object:

The wool is first scoured or cleansed, and from the hydro-extracter is placed in a room, or tight apartment, while yet in a wet state. This apartment is (or not, as desirable,) provided with grating, racks, shelves, &c., upon which it may be desirable sometimes to place the wool. Into this room or apartment we introduce vapors (as nitrous vapors) with a jet of steam sufficient to maintain a temperature of heat equal to 150° Fahrenheit for about five hours, (but it is believed that the duration of heat by steam may be greatly varied,) after which the wool should be removed from said apartment and dried perfectly dry. The drugs employed or made use of for generating vapors, are sulphur and nitrate of soda, with sulphuric acid enough to decompose, dissolve, or moisten the nitre, which are to be burned together, as described, in the proportion of twelve pounds or parts of sulphur or brimstone (commercial) to one part each of nitre and sulphuric acid for five hundred pounds of wool. These vapors can be generated in a great variety of ways, and by the use of several drugs besides those enumerated above, and for this reason we do not wish to be confined to the particular way or particular drugs in producing the vapor to be diffused into the wool.

In the accompanying drawings is shown a plan elevation of a room in which the wool is placed for removing burrs and other vegetable substances, with a furnace attached for preparing destructive or chemical vapor, and a pipe for the introduction of steam, for the double purpose of heating the room and as a joint agent in diffusing the vapor in the wool.

$a$ is the room or apartment; $a^1$ is the interior lining of the apartment, made of any suitable material, as sheet lead, &c.; $a^2$ is a shelf, rack, or grating, upon which the wool is placed; $a^3$ is a cock for drawing off the vinegar or condensation of the vapor or acid. (This acid, after having been used as above described, is worth for other purposes nearly or quite the original cost of drugs used.) $a^4$ is a furnace; $a^5$ is a receptacle in which the brimstone is placed; $a^6$ is a receptacle placed directly over the former, in which the chemicals or acids are placed for evaporizing by the heat from beneath the burning brimstone; $a^7$ is an aperture through which the vapor passes into the room and mingles with, and is diffused by, the joint action of the steam which enters the room through the pipe $a^8$ into the wool.

We believe we have thus described the nature and process by which we are enabled to effect the destruction of burrs and other vegetable matter in wool without injury to its staple, and so as to enable others skilled in the art to practise the same therefrom.

What we claim, therefore, and desire to secure by Letters Patent, is—

1. The employment of chemical vapors in the process of destroying burrs and other foreign vegetable substances in wool, substantially as described.

2. We claim the employment of steam as a joint agent in diffusing the vapor and heating the apartment to produce the result described.

3. We claim the process of destroying burrs or other foreign vegetable substances in wool, substantially as set forth.

JOHN W. BOYNTON. [L. S.]
JOHN A. McGAW. [L. S.]

Witnesses:
E. N. MILLER,
FRED. M. PATRICK, } as to McGAW.
JEREMY W. BLISS,
FRED. M. PATRICK, } as to BOYNTON.